Dec. 29, 1964   R. D. ZIMMERMAN   3,163,244
ROCK DRILL BIT HAVING NON-ALIGNED CUTTING MEMBERS
Filed May 19, 1961   3 Sheets-Sheet 1

INVENTOR
ROBERT D. ZIMMERMAN
BY
HIS ATTORNEY

Dec. 29, 1964  R. D. ZIMMERMAN  3,163,244
ROCK DRILL BIT HAVING NON-ALIGNED CUTTING MEMBERS
Filed May 19, 1961  3 Sheets-Sheet 2

FIG. IA

INVENTOR
ROBERT D. ZIMMERMAN
BY
ATTORNEY

Dec. 29, 1964  R. D. ZIMMERMAN  3,163,244
ROCK DRILL BIT HAVING NON-ALIGNED CUTTING MEMBERS
Filed May 19, 1961  3 Sheets-Sheet 3

INVENTOR
ROBERT D. ZIMMERMAN
BY
ATTORNEY

United States Patent Office 3,163,244
Patented Dec. 29, 1964

3,163,244
ROCK DRILL BIT HAVING NON-ALIGNED
CUTTING MEMBERS
Robert D. Zimmerman, Andover, N.J., assignor to Ingersoll-Rand Company, New York, N.Y., a corporation of New Jersey
Filed May 19, 1961, Ser. No. 111,315
5 Claims. (Cl. 175—398)

This invention relates to rock drill bits and particularly to that type of bit employed in rotary percussion drills.

Drill bits of this type, as heretofore constructed, are provided with radially positioned cutting edges in a cross or X pattern, which are generally considered to be highly effective in rock drilling operations. However, when the bit is of large size the cutting edges are so far apart that each cutting edge tends to operate individually to break out chips instead of cooperating to break out large pieces or, substantial quantities of material. In addition, in the manufacturing process of brazing inserts in the body of the drill bit, objectionable stresses in the bit body, the brazing, and in the inserts are produced by reason of the different coefficients of expansion of the material of which the body, brazing and inserts are made. The quick and continuous removal of the cuttings to provide a clean cutting face in the hole being drilled is also a problem as the cuttings will slow the drilling progress if permitted to remain in the drill hole.

It is then an object of this invention to provide a rock drill bit which has an improved arrangement of cutting edges to achieve increased drilling capacity, and consequently, increased drilling speed.

Another object of this invention is to provide a rock drill bit which minimizes the tendency of rifling found in other types of rock drill bits.

Yet another object of this invention is to provide a rock drill bit having a high resistance to wear, and particularly to gauge wear.

Still another object of this invention is to provide a rock drill bit with which a highly effective cleansing of the hole being drilled is achieved.

Another object of this invention is to provide a rock drill bit which can be easily ground.

Still another object of this invention is to provide a rock drill bit having inserts brazed therein in which the objectionable stresses in the drill bit body, the inserts, and the brazing are substantially reduced.

Other objects and advantages of the invention will be in part obvious and in part pointed out hereinafter.

Figure 1:
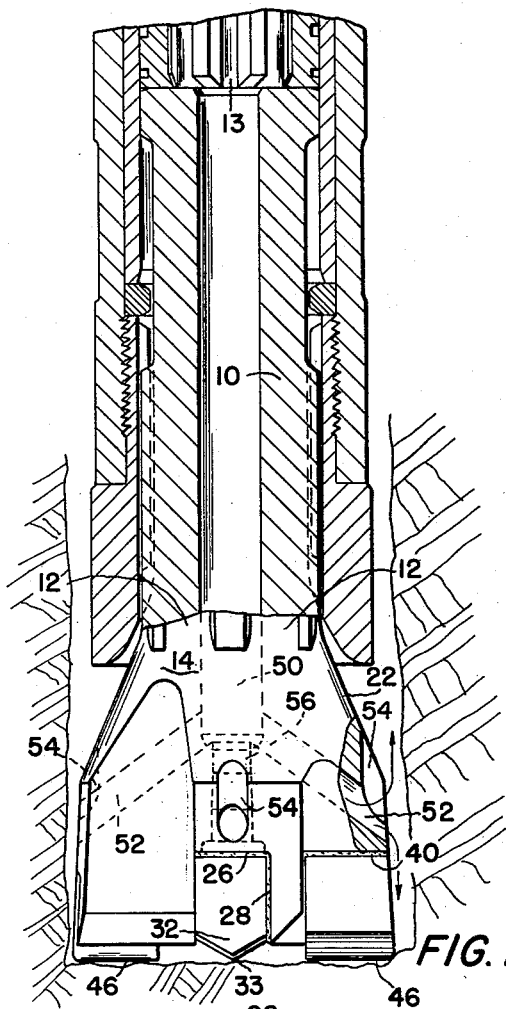
Figure 2:
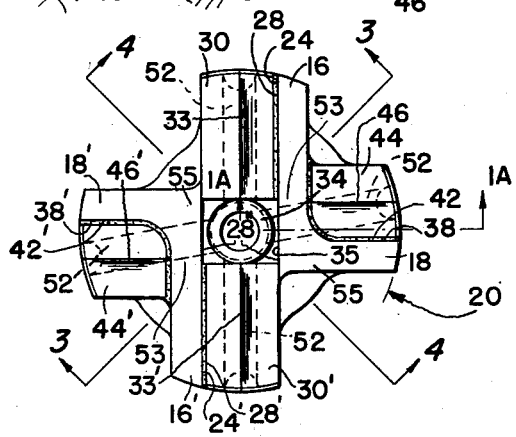
Figure 6:
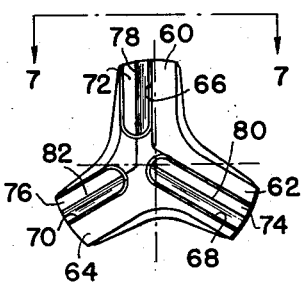
Figure 5A:
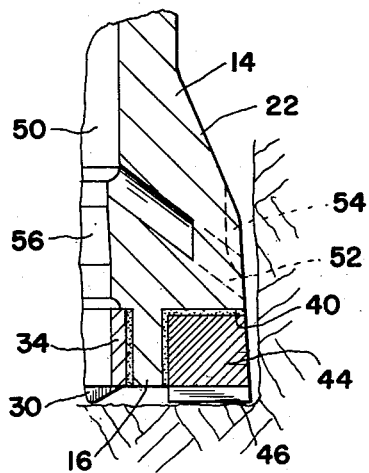
Figure 5A:
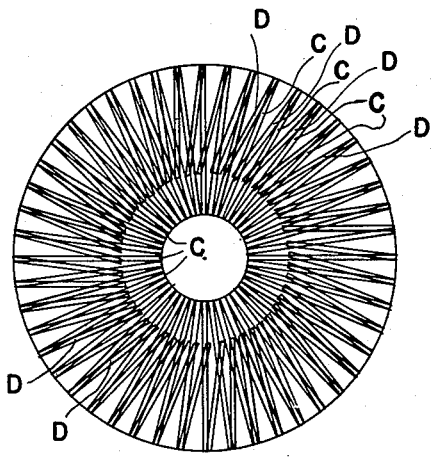
Figure 7:
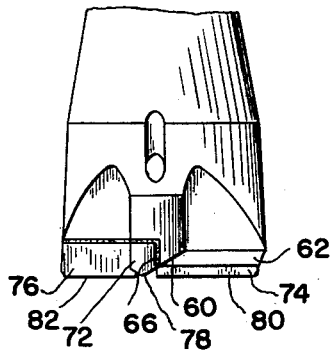
Figure 3:
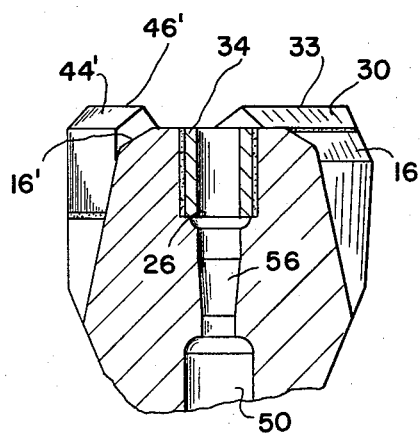
Figure 5:
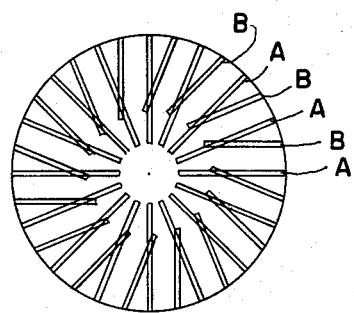
Figure 4:
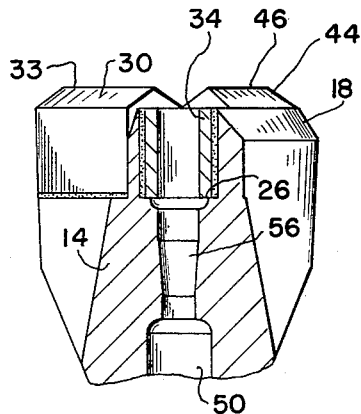

The invention will be more readily understood by reference to the following description taken with the drawings, in which FIGURE 1 is a view, partly in longitudinal section, of a drill bit constructed in accordance with the present invention, FIG. 1A shows a section taken along the line 1A—1A of FIG. 2 looking in the direction of the arrows, FIG. 2 is a view in elevation of the cutting face of the drill bit, FIG. 3 is a longitudinal section of the front portion of the drill bit taken along line 3—3 of FIG. 2 looking in the direction of the arrows, FIG. 4 is a section of the front portion of the drill bit taken along line 4—4 of FIG. 2 looking in the direction of the arrows, FIG. 5 shows a pattern of the positions of the cutting edges of the inserts relative to each other upon one revolution of the drill bit, as the drill bit rotates and percussively impinges against the material to be drilled, FIG. 5A shows a pattern of the cutting edges of the inserts relative to each other upon a plurality of revolutions of the drill bit, FIG. 6 shows a view of the front portion of another embodiment of this invention, and FIG. 7 is a view in elevation of the drill bit shown in FIG. 6 looking in the direction of the arrows.

For illustration purposes the drill bit according to this invention will be described as the type adapted for use in so-called "down-the-hole" drills, but it is to be understood that the invention is not limited thereto; that the drill bit according to this invention has application to a wide variety of percussive, rotary drilling devices.

As shown in FIG. 1, the drill bit has a shank portion 10 adapted to extend into the front end of the drill and is provided with flutes 12 to engage the drill chuck. The rear end of shank 10 is adapted to be directly or indirectly struck by a hammer 13 (partly shown) and to transmit blows to the bottom of the hole being drilled. At the front end of shank 10 is provided a body portion 14 having a plurality of wings extending axially and laterally therefrom. In the embodiment shown in FIGS. 1 to 4 there are four wings arranged in pairs, the wings 16 and 16' forming one pair are in alignment with each other while the wings 18 and 18' of another pair, although perpendicular to wings 16 and 16' and parallel to each other, are laterally off-set with respect to each other. Each wing extends outwardly to a circumscribing circle 20, which is approximately the size of the hole being drilled and which is ordinarily called the "gauge" of the bit.

Body portion 14 has a frusto-conical shaped portion 22 extending from shank 10 to merge with the outer lateral faces of wings 16, 16' and 18, 18' which faces diverge forwardly under a smaller taper angle than that of the frusto-conical portion 22 until they substantially attain the diameter of gauge circle 20.

The wings are provided with recesses of a special form, as compared to the grooves in the wings of commonly known type drill bits, to receive the inserted cutting members. These cutting members are inserts, generally of tungsten carbide, differing in size for the various wings 16 and 18. As will be seen particularly in FIGS. 2 and 3, there is provided a recess 24 of an L-shaped cross section in wing 16, and a recess 24' of an L-shaped cross section in wing 16'. Recesses 24 and 24' are co-extensive with a central groove 35 to form with the latter a continuous groove extending diametrically from the outer periphery of wing 16 to the outer periphery of wing 16'. This continuous groove has a bottom face 26 transverse to the axis of the bit, a pair of oppositely disposed faces 28" formed by central groove 35 extending normal to bottom face 26, and upstanding faces 28 and 28' each of which lies in coplanar relationship with a face 28". Recesses 24 and 24' are adapted to receive cutting inserts 30 and 30', respectively, which are brazed in the recesses as hereinafter fully described.

Inserts 30 and 30' have a substantially rectangular body portion and an integral triangular shaped portion 32 projecting outwardly from the face of the drill bit, the apex of the triangular shaped portion 32 forming a cutting edge 33. Each insert is of such length and so positioned within the associated recess that the inner lateral ends of the inserts abut a spacer ring 34, inserted coaxially of the drill bit in central groove 35. The outer lateral ends of inserts 30, 30' extend outwardly to cooperate and merge with the outer lateral ends of wings 16, 16' to form the gauge faces of wings 16 and 16'. Spacer ring 34 is secured to the drill bit body and to inserts 30, 30' by brazing material disposed in the space between the inner ends of the inserts, the outer periphery of ring 34 and the portions of upstanding faces 28" of groove 35.

Wings 18 and 18' have L-shaped recesses 38 and 38' similar to but much shorter than recesses 24 and 24' in wings 16, 16'. Recesses 38 and 38', although extending perpendicular to recesses 24, 24' and parallel to each other, are laterally off-set with respect to each other. Each recess 38, 38' extends outwardly from a point in spaced relationship to the upstanding faces 28, 28' of recesses 24, 24', to gauge circle 20. Each recess 38 and 38' has a bottom face 40 and an upright wall 42 extending normal to bottom face 40. Hard metal inserts 44 and 44' of a cross section similar to inserts 30 and 30' are brazed to wings 18 and 18' at bottom faces 40 and upstanding faces 42. Inserts 44 and 44' are also provided with cutting edges 46 and 46' similar to cutting edges 33 and 33'.

As is usual in bits of this type air or water or both are used as a cleansing agent to remove drill cuttings as they are formed, and for this purpose the bit is provided with a center passage 50 to conduct such cleansing fluid. This passage is continuous through the center of ring 34 and is provided with additional branch passages in the bit body 14, as hereinafter fully described.

Each wing 16, 16' and 18, 18' is provided with an angularly disposed passage 52 leading forwardly sloping from passage 50 to the gauge faces of the wings and terminating rearwardly of the inserts in those wings. A portion of the cleansing fluid flowing from passages 52 is caused to flow generally radially but primarily forwardly along the periphery of the gauge faces of wings 16, 16' and 18, 18'. To provide for a portion of the cleansing fluid to flow from passages 52 rearwardly in the same direction as cleansing fluid flowing from the bottom of the hole being drilled, notches 54 are provided at the outer terminations of passages 52 which notches are so formed as to cause a portion of the cleansing fluid to flow upwardly (see FIG. 1).

There are many advantages to the aforementioned construction. From the standpoint of drilling, it will be noted that the arrangement of the cutting edges of the inserts is such that the off-setting of these inserts and their cutting edges results in an increased drilling capacity of the drill bit, as illustrated in FIGS. 5 and 5A. A designates the positions of the cuts made by the cutting edges of inserts 30 and 30' as the drill bit is rotated from one percussion position to the other on the bottom of the hole being drilled for part of one revolution of the drill bit. B designates the positions of the cuts made by the cutting edges of inserts 44, 44' during the same partial revolution of the drill bit, such positions being non-radial because of the "off-setting" of inserts 44, 44' and their cutting edges. It is then clearly illustrated that such radial and non-radial A and B cuts not only intersect the radial and non-radial dams between the radial and non-radial cuts, but also intersect one another and thus cooperate to rapidly break out the material between the cuts instead of having each cutting edge, when only conventionally arranged cutting edges are used, to individually cut out chips. Such cooperation of the cutting edges of the present invention is more clearly illustrated in FIG. 5A in which lines C designate the various consecutive positions of the radial cutting edges, and lines D designate the corresponding positions of the off-set cutting edges relative to the C positions. Lines C and D show that cuts formed by the radial cutting edges are intersected at more than one point by cuts formed by the off-set cutting edges upon a plurality of revolutions of the drill bit. It is then clear that, with the aforementioned off-set arrangement, the intersecting cuts produced by the cutting edges is substantial and results in rapidly breaking out substantial quantities of the material to be drilled.

Another feature of the drill bit according to this invention having "off-set" cutting edges is that there is accomplished a positive resistance to rifling as a result of the arrangement of the unequal distances between consecutive cutting edges, such rifling being common when applying a drill bit having equally distanced cutting edges for drilling operations.

Yet another feature of the drill bit according to this invention is that when regrinding of the cutting edges of the inserts is required grinding operations are facilitated. With the commonly known type of drill bits having the inserts in a cross or X pattern the four inner ends of the cutting edges terminate at the cleansing fluid center passage of the drill bit. As these inner ends are substantially close to each other, grinding of the cutting edges of the inserts may result in grinding off the inner ends of or damaging the cutting edges of an adjacent insert thereby reducing the effective length of the cutting edges, and resulting decreased cutting efficiency of the drill bit. FIG. 2 clearly illustrates that the type of drill bit according to this invention with an "off-set" drilling pattern obviates the possibility in grinding off or causing accidental damage to adjacent cutting edges because the laterally spaced inner ends of the inserts 44, 44' relative to the inner ends of inserts 30, 30' provides relatively large spaces between the adjacent inner ends of inserts 44, 44', 30 and 30' which affords easy access to the cutting edges of the inserts during the grinding thereof.

From a manufacturing standpoint, the objectionable stresses in the bit body, inserts, and brazing material produced by brazing the inserts in the bit body, are minimized by the provision of the L-shaped or open sided recesses 24, 24' and 38, 38' as compared to the stresses produced in the conventional drill bits having the commonly known U-shaped grooves for receiving the inserts. In a wing of conventional construction having a U-shaped groove all sides except the outer lateral end of the insert is brazed whereas the drill bit of this invention, since the recess in L-shaped, one upstanding side of the wing is omitted thereby eliminating the stresses that would be associated with that side of the wing in the brazing process.

Referring to the manner of conducting the cleansing fluid to clear the hole being drilled from chips, it is to be noted that, as shown in FIG. 1, cleansing fluid flows radially from passages 52 along the periphery of the gauge faces of the drill bit as indicated by the arrows. Since the spaces between the wall of the hole being drilled and such gauge faces are relatively small, one of the features of this invention is that the cuttings and fine particles of rock forced by the cleasing fluid discharging from passage 50 to the bottom of the hole being drilled and flowing in the direction of any side of such spaces will be prevented from entering the spaces by the flow of a portion of the fluid discharging from passage 52 flowing forwardly adjacent said faces of the wings. The prevention of the flow of cuttings in the spaces between faces of the wings and the surface of the hole obviates wear and damage to the brazings and gauge faces of the drill bit. As grooves 38, 38' are shorter than grooves 24, 24' and are positioned in off-set relationship to each other improved cleansing fluid flow paths are provided as compared to those in the commonly known type of drill bits with non-off-set inserts. As clearly shown in FIG. 2 such an "off-set" arrangement creates passages 53 and 55 through which the cleansing fluid from passage 50 flows, the total flow area of passages 53 and 55 being greater than the flow area of the corresponding passages in drill bits of the symmetrical non-off-set type. The increased flow area provided by passages 53 and 55 is of particular importance to the maintenance of an effective flow rate of cleansing fluid past the drill bit when the cutting edges wear off and the distance between the bottom of the flow passages and the bottom of the hole being drilled decreases. It can be readily seen that the drill bit according to this invention maintains an effective flow rate of cleansing fluid past the drill bit through substantially the entire operative life of the drill bit.

Another feature of the aforementioned cleansing fluid conductance is that by means of notches 54 an additional flow in a rearward direction is created which flow assists the rearward flow of cleansing fluid including the chips forced from the bottom of the hole being drilled. In addition thereto any back flow of cleansing fluid and abrasive material in a forward direction into the aforementioned space between the gauge face and the wall of the hole being drilled is prevented.

Another embodiment of this invention is shown in FIGS. 6 and 7 in which the drill bit is provided with three wings 60, 62 and 64, having recesses 66, 68 and 70, recesses 66 and 70 preferably of the open sided type, with inserts 72, 74 and 76, respectively, mounted in the recesses. Inserts 72, 74 and 76 are ground to form cutting edges 78, 80 and 82, respectively, the inserts and the associated cutting edges being positioned such that there is formed a radial cutting edge 80 and non-radial cutting edges 78 and 82. With such an arrangement of cutting edges a pattern of intersecting cuts is produced which is similar to the pattern illustrated in FIG. 5, with the corresponding advantages as explained in connection with the "off-set" drill bit of the embodiment shown in FIGS. 1 to 5.

Thus by the above construction are accomplished, among others, the objects hereinbefore referred to.

While two embodiments of the present invention are shown and described in detail, it is to be understood that various changes and modifications may be made without departing from the spirit and scope of the invention as set forth in the appended claims.

I claim:

1. A rock drill bit comprising a body portion, a plurality of wings extending axially and laterally therefrom, each wing having an open groove formed in its end and having a bottoming face and a single side face, one pair of said wings being arranged with their grooves in alignment with each other and the other pair of said wings being arranged with their grooves off-set and parallel with respect to each other and perpendicular to the first said pair of wings, and a hard metal insert secured in each such groove, each insert having a cutting edge forwardly extending with respect to the body portion and an exposed lateral end and a bare side face, the inserts in said aligned grooves being longer than the inserts in said off-set grooves.

2. A rock drill bit comprising a body portion, a plurality of wings extending axially and laterally therefrom, each wing having an open groove formed in its end and having a bottoming face and a single side face, one pair of said wings being arranged with their grooves in radial alignment with each other and the other pair of said wings being arranged with their grooves off-set and parallel with respect to each other and perpendicular to the first said pair of wings, and a hard metal insert secured in each such groove, each insert having a cutting edge forwardly extending with respect to the body portion and an exposed lateral end and a bare side face, said body portion being provided with a central passage to conduct cleansing fluid, and at least one of said wings being provided with a passage extending from said central passage to the outer lateral end of the associated wing adjacent said insert.

3. A rock drill bit comprising a body portion, a plurality of wings extending axially and laterally therefrom, each wing having an open groove formed in its end and having a bottoming face and a single side face, one pair of said wings being arranged with their grooves in radial alignment with each other and the other pair of said wings being arranged with their grooves off-set and parallel with respect to each other and perpendicular to the first said pair of wings, and a hard metal insert secured in each such groove, each insert having a cutting edge forwardly extending with respect to the body portion and an exposed lateral end and a bare side face, said body portion being provided with a central passage to conduct cleansing fluid, and at least one of said wings being provided with a passage extending from said central passage to the wing extremities adjacent said insert, each of said wings having such a passage being provided with at least one notch at the outer lateral end of the associated wing.

4. A rock drill bit comprising a body portion, a plurality of wings extending axially and laterally therefrom, each wing having an open groove formed in its end and having a bottoming face and a single side face, one pair of said wings being arranged with their grooves in radial alignment with each other and the other pair of said wings being arranged with their grooves off-set and parallel with respect to each other and perpendicular to the first said pair of wings, and a hard metal insert secured in each such groove, each insert having a cutting edge forwardly extending with respect to the body portion and an exposed lateral end and a bare side face, said body portion being provided with a central passage to conduct cleansing fluid, and at least one of said wings being provided with a passage extending from said central passage to the wing extremities adjacent said insert, each of said wings having such a passage being provided with at least one notch at the outer lateral end of the associated wing, said body portion having a cone shaped portion merging with said wings.

5. A rock drill bit comprising a body portion, a plurality of wings extending axially and laterally therefrom, each wing having an open groove formed in its end and having a bottoming face and a single side face, one pair of said wings being arranged with their grooves in radial alignment with each other and the other pair of said wings being arranged with their grooves off-set and parallel with respect to each other and perpendicular to the first said pair of wings, and a hard metal insert secured in each such groove, each insert having a cutting edge forwardly extending with respect to the body portion and an exposed lateral end and a bare side face, said inserts having their cutting edges extending axially beyond said body portion and said wings, each cutting edge being substantially parallel to the lateral axis of the associated wing.

References Cited in the file of this patent

UNITED STATES PATENTS

| | | |
|---|---|---|
| 158,704 | Hanrahan | Jan. 12, 1875 |
| 1,887,372 | Emmons | Nov. 8, 1932 |
| 2,056,319 | Harrington | Oct. 6, 1936 |
| 2,108,955 | Zublin | Feb. 22, 1938 |
| 2,174,791 | Kruttschnitt | Oct. 3, 1939 |
| 2,502,128 | Curtis | Mar. 28, 1950 |
| 2,521,791 | Harrington | Sept. 12, 1950 |
| 2,628,072 | Baker | Feb. 10, 1953 |
| 2,740,611 | Bowen | Apr. 3, 1956 |
| 2,756,024 | MacDonald | July 24, 1956 |
| 2,802,642 | Fencht | Aug. 13, 1957 |

FOREIGN PATENTS

| | | |
|---|---|---|
| 124,993 | Sweden | May 24, 1949 |
| 302,460 | Switzerland | May 24, 1955 |
| 530,113 | Great Britain | Dec. 12, 1940 |
| 1,085,118 | Germany | July 14, 1960 |